United States Patent [19]
Kosal et al.

[11] Patent Number: 5,563,211
[45] Date of Patent: Oct. 8, 1996

[54] EXTRUDABLE SILICONE ELASTOMER WITH IMPROVED MOLD RELEASE

[75] Inventors: Diane M. Kosal, Midland, Mich.; Melanie J. Van der Veen, Thornhill, United Kingdom

[73] Assignee: Dow Corning Corporation, Midland, Mich.

[21] Appl. No.: 543,430

[22] Filed: Oct. 16, 1995

[51] Int. Cl.⁶ .............................. C08K 5/24; C08L 83/04
[52] U.S. Cl. ......................... 524/731; 524/847; 524/862; 524/863
[58] Field of Search .................................... 524/863, 862, 524/847, 731

[56] References Cited

U.S. PATENT DOCUMENTS

| | | | |
|---|---|---|---|
| 3,671,480 | 6/1972 | Wada et al. | 260/29.1 SB |
| 3,697,473 | 10/1972 | Polmanteer et al. | 260/37 SB |
| 3,884,886 | 5/1975 | Plueddemann | 260/80 PS |
| 4,162,243 | 7/1979 | Lee et al. | 260/37 SB |

*Primary Examiner*—Melvyn I. Marquis
*Assistant Examiner*—Karen A. Dean
*Attorney, Agent, or Firm*—William F. Boley

[57] ABSTRACT

A composition curable to a silicone elastomer is prepared by mixing a triorganosiloxy endblocked polydimethylsiloxane fluid where the triorganosiloxy is dimethylvinylsiloxy or methylphenylvinylsiloxy, a reinforcing silica having a surface treated with organosiloxane groups which contain 0.05 to 0.32 percent by weight vinyl, a hydroxy end-terminated polydiethylsiloxane fluid, an organohydrogensiloxane fluid, a platinum catalyst, and optionally a platinum catalyst inhibitor. The triorganosiloxy endblocked polydimethylsiloxane fluid has a major peak molecular weight of 68,000 to 135,000, a dispersity index greater than 3.8, the lowest molecular weight species between 854 and 3146 and the highest molecular weight species between 174,000 and 370,000. These compositions are readily extrudable under low pressure, have improved pot-life, cure to high strength elastomers with a high durometer, and have improved mold release.

21 Claims, No Drawings

EXTRUDABLE SILICONE ELASTOMER WITH IMPROVED MOLD RELEASE

BACKGROUND OF THE INVENTION

This invention relates to a silicone elastomer composition which is extrudable, has improved pot life, cures to a high strength, high durometer silicone elastomer, and which has improved mold release.

Silicone elastomers can be made from many different polyorganosiloxanes, cure mechanisms and fillers. These silicone elastomers have been made from stiff gum polymers as well as water thin fluids. The curing mechanisms have ranged from organic peroxides to moisture sensitive means to radiation. A variety of fillers have also been used, such as reinforcing silica fillers and extending fillers. One unique silicone elastomeric composition can be prepared from a vinyl-containing polydiorganosiloxane, an organohydrogensilicon crosslinker, a platinum catalyst and optionally fillers. These compositions are desirable for many reasons including curing without leaving groups, curing either at room temperature or at elevated temperature, stability at room temperature storage by using a platinum catalyst inhibitor, and capable of being made from either high viscosity or low viscosity polymers.

The present invention offers a further refinement of such silicone elastomer compositions by providing a composition which is readily extrudable and moldable at low pressure, improved in pot-life, curable to elastomers with high strength and high durometer in relatively short periods of time, and which has improved mold release.

Wada et al., U.S. Pat. No. 3,671,480, describe a heat curable elastomeric silicone composition comprising a mixture of two polydiorganosiloxanes, each of which contains vinyl unsaturation, a silica filler, a polyorganohydrogensiloxane and a platinum compound. The compositions described by Wada et al. are stated to cure to high tear strength, flame retardant, heat resistant elastomers with superior compression set. These compositions are not readily extrudable but require pressing into shape under substantial pressure and then cured.

Polmanteer et al. in U.S. Pat. No. 3,697,473 describe a composition which is fluid and consists essentially of a polydiorganosiloxane having two vinyl radicals per molecule and being terminated with triorganosiloxy group, a mixture of silicone compounds containing silicon-bonded hydrogen atoms, one compound containing two silicon-bonded hydrogen atoms per molecule and another compound containing three to 10 silicon-bonded hydrogen atoms per molecule and cured with a platinum catalyst, and optionally a reinforcing silica. Although these compositions described by Polmanteer et al. are fluid, the cured elastomers have low modulus and a low durometer with high tensile strengths and elongations. Such compositions may be useful for many applications, but do not obtain the high durometers along with the high tear strengths and tensile strengths which are required in other applications.

Jeram et al., U.S. Pat. No. 3,884,866, describe an organopolysiloxane composition for low pressure injection molding and which is described as having high tensile strength, good elongation, and high tear. These compositions described by Jeram et al. comprise 20 to 90 parts of a vinyl-containing high viscosity organopolysiloxane having a viscosity of 5 Pa·s to 1,000 Pa·s, five to 40 parts of a low viscosity vinyl-containing organopolysiloxane having a viscosity of 50 mPa·s to 5 Pa·s, five to 70 parts of filler and 0.1 to 50 parts per million of a platinum catalyst. This composition is cured by mixing 100 parts of it with one to 100 parts of a hydrogen silicone composition.

Lee et al., U.S. Pat. No. 4,162,243, describe a composition curable to a silicone elastomer. The composition is prepared by mixing a triorganosiloxy endblocked polydimethylsiloxane fluid where the triorganosiloxy is dimethylvinylsiloxy or methylphenylvinylsiloxy, a reinforcing silica having a surface treated with organosiloxane groups which contain 0.05 to 0.32 percent by weight vinyl, a fluid organohydrogensiloxane, a platinum catalyst and optionally a platinum catalyst inhibitor. The polydimethylsiloxane fluid has a major peak molecular weight of 68,000 to 135,000, a dispersity index greater than 3.8, the lowest molecular weight species between 854 and 3146 and the highest molecular weight species between 174 and 370,000. The compositions are readily extrudable under low pressure and cure to high strength elastomers with a high durometer. However, such compositions' pot-life and mold release properties are not as good as desired in certain applications. The present inventors have found that by adding certain hydroxy end-terminated polydimethylsiloxanes within a defined concentration range to the compositions of Lee et al., the pot-life of the composition as well as the mold release of the cured composition can be improved.

SUMMARY OF THE INVENTION

The silicone elastomeric compositions of this invention maintain their readily extrudable characteristic while through a synergistic reaction between a certain triorganosiloxy endblocked polydimethylsiloxane fluid which contains vinyl in the triorganosiloxy units and a certain reinforcing amorphous silica having vinyl-containing organosiloxane groups bonded to its surface cure to elastomers with high tensile strengths, high durometer and high tear strengths. The molecular weight distribution of the fluid combined with certain silica-containing vinyl radicals on its surface provide elastomers of high tensile strengths, high tear strength and high durometer without increasing the viscosity of the composition to a point which make it impractical to use these compositions for low pressure injection molding processes. In addition the composition of this invention comprises a low-molecular weight hydroxy end-terminated polydimethylsiloxane fluid which imparts improved pot-life to the composition and improved mold release to the cured composition.

Compositions of this invention are obtained by mixing the triorganosiloxy endblocked polydimethylsiloxane fluid, reinforcing amorphous silica, low-molecular weight hydroxy end-terminated polydimethylsiloxane fluid, organohydrogensiloxane, platinum catalyst, and optionally a platinum catalyst inhibitor.

DESCRIPTION OF THE INVENTION

This invention relates to a silicone elastomeric composition consisting essentially of a product obtained by mixing (A) 100 parts by weight of a triorganosiloxy endblocked polydimethylsiloxane fluid in which the triorganosiloxy units are selected from the group consisting of dimethylvinylsiloxy and methylphenylvinylsiloxy, the fluid being a mixture of polymeric species of varying molecular weight where each species is present in an amount sufficient to collectively provide a molecular weight distribution such that there is present at least one polymeric species (1) at a concentration greater than the concentrations of adjacent polymeric species of lower and higher molecular weight where polymeric species (1) is identified as a peak molecular weight as determined by gel permeation chromatographic analysis and there being a peak molecular weight of polymeric species in the range of from 68,000 to 135,000 at a major concentration, in said fluid the molecular weight of the lowest molecular weight polymeric species being in the range of from 854 to 3146 and the molecular weight of the highest molecular weight species being in the range of from 174,000 to 370,000, the mixture of polymeric species having a molecular weight distribution such that a dispersity index has a value greater than 3.8, (B) from 20 to 60 parts by weight of a reinforcing amorphous silica having a surface area of greater than 100 square meters per gram, the surface of the silica having silicon atoms to which are bonded organosiloxane groups selected from the group consisting of (a) $Me_3SiO—$, (b) $ViMe_2SiO(Me_2SiO)_x—$, (c) $ViMePhSiO(Me2SiO)_x—$, and (d) $—O(MeVi)Si—(OSiMe_2)_y—O—$ where Me is methyl, Vi is vinyl, Ph is phenyl, x is an integer of 0 to 20, and y is an integer of one to five, the organosiloxane groups being present in an amount such that there is from 0.05 to 0.32 percent by weight vinyl based on the weight of the silica and the organosiloxane groups being present in a mole ratio such that there is from seven to 50 moles of (a) for each mole of (b), (c), (d), or mixture thereof, (C) about 0.3 to 1.8 percent by weight of hydroxy end-terminated polydimethylsiloxane having a viscosity at 25° C. within a range of about 20 mPa·s to 60 mPa·s (D) an amount of a fluid organohydrogensiloxane sufficient to provide from one to three silicon-bonded hydrogen atoms per vinyl radical in (A) and (B) combined, the organohydrogensiloxane having an average of at least three silicon-bonded hydrogen atoms per molecule and consisting essentially of units selected from a group consisting of methylhydrogensiloxane, dimethylsiloxane, dimethylhydrogensiloxy, trimethylsiloxy, and $SiO_2$, and (E) an amount of a platinum catalyst sufficient to provide at least one part by weight platinum per one million parts by weight of (A), said platinum catalyst being soluble in (A), the silicone elastomer composition having a viscosity such that at least 30 grams per minute of the composition can be extruded through a 3.2 mm orifice under a pressure of 620 kilopascals (kPa).

The triorganosiloxy endblocked polydimethylsiloxane fluid of (A) is a type of polydiorganosiloxane which is well known in the art. For the purpose of this invention, the triorganosiloxy units can be dimethylvinylsiloxy or methylphenylvinylsiloxy. Although the fluid is described as polydimethylsiloxane, it would be expected that small amounts of other diorganosiloxane units or monorganosiloxane units without substantially altering the character of the fluid can be used. For convenience, the triorganosiloxy endblocked polydimethylsiloxane will be referred to herein as "fluid (A)".

Fluid (A) is a mixture of polymeric species of varying molecular weight. Each polymeric species of a certain molecular weight is present in a certain concentration and contributes to the final character of fluid (A). Collectively the total number of species provide a molecular weight distribution which is fluid (A). The distribution of polymeric species is in accordance to the concentration of each polymeric species of a certain molecular weight. In fluid (A), there is present at least one polymeric species (1) at a concentration greater than the concentration of adjacent polymeric species of lower and higher molecular weight.

Polymeric species (1) can be identified as having a peak molecular weight, PM, as determined by gel permeation chromatographic analysis. Fluid (A) has a PM in a range of 68,000 to 135,000 which is at a major concentration. However, not all triorganosiloxy endblocked polydimethylsiloxanes are suitable for fluid (A) of this invention. Fluid (A) also requires a dispersity index, DI, of greater than 3.8. The DI is an indicator relating the concentrations of all the species and is the weight average molecular weight divided by the number average molecular weight. In fluid (A), the lowest molecular weight polymeric species are in a range of 854 and 3146 and the highest molecular weight polymeric species are in a range of 174,000 to 370,000. Fluid (A) can have more than one PM, such as two or three, as long as the DI and the other parameters remain within the above defined limits. One preferred embodiment is a composition which is prepared from fluid (A) in which there are two PM, a major PM in the range of 68,000 to 135,000 and a minor PM in the range of 4,000 to 24,100. Major PM refers to the PM having the greatest concentration and the minor PM refers to a lesser concentration. Preferred fluid (A) is one having a PM in the range of 80,000 to 120,000 at a major concentration and a DI in the range of six to 12. Another preferred fluid (A) is one having two PM, a major PM in the range of 80,000 to 120,000, a minor PM in the range of 7,000 to 15,000 and a DI in the range of six to 12.

Conventional, methods of polymerization for the preparation of polydimethylsiloxanes do not automatically provide fluid (A). Fluid (A) can be obtained by blending various fluid polydimethylsiloxanes to obtain the proper DI, PM, and molecular weight limits. For example, two fluids with different PM but with each having a DI less than 3.8 can be blended to provide a PM within the defined limits for fluid (A) and a DI of greater than 3.8.

Another method of preparing fluid (A) is described by Lee in U.S. Pat. No. 3,445,426 which is hereby incorporated by reference to show a method of preparing suitable polydimethylsiloxanes. Briefly, the method produces a monodispersed hydroxy end-terminated polydimethylsiloxane which can be reacted with a hexaorganodisilazane, triorganochlorosilane, or triorgano(N-methylacetamido)silane. Such monodispersed polydimethylsiloxanes can be blended to produce fluid (A). Also disclosed in Lee is a method of making a fluid having two PM. In this method, polymerization is started and allowed to proceed for a determined time, then more ingredients are added and the polymerization is allowed to continue whereby a fluid (A) can be produced having a major PM and a minor PM.

The reinforcing amorphous silica of (B) is based on the well-known silicas which are commercially available and which have a surface area of at least 100 square meters per gram ($M^2$/g), preferably 120 to 600 $M^2$/g. The reinforcing amorphous silica have surface with silicon atoms to which are bonded organosiloxane groups. The organosiloxane groups bonded to the silica surface of this invention are described by formulas (a) $Me_3SiO—$, (b) $ViMe_2SiO(Me_2SiO)_x—$, (c) $ViMePhSiO(Me_2SiO)_x—$, and (d) $—O(MeVi)Si—(OSiMe_2)_y—O—$ where Me is methyl, Vi is vinyl, Ph is phenyl, x is an integer of 0 to 20, and y is an integer of one to five. The organosiloxane groups are present on the silica in an amount sufficient to provide from 0.05 to 0.32 percent by weight vinyl radical based on the weight of the silica, and are present in a mole ratio such that there is from seven to 50 moles of organosiloxane group (a) for each mole of organosiloxane group (b), (c), (d) or mixtures thereof. The organosiloxane groups on the silica are preferably a combination of (a) and (b) in which x is zero to five or a combination of (a) and (d). Preferred is a silica having bonded to the surface trimethylsiloxy groups and dimethylvinylsiloxy groups in a mole ratio of 20 to one respectively. Also preferred is a silica having bonded to its surface trimethylsiloxy groups (a) and (d) in a mole ratio of 10 to one respectively. The reinforcing amorphous silica having organosiloxane groups bonded to its surface is present in an amount of 20 to 60 parts by weight based on 100 parts by weight of fluid (A), preferably 35 to 45 parts by weight on the same basis. The reinforcing amorphous silica includes fume silica and precipitated silica.

The silicas of (B) can be prepared by treating the silica with organosiloxane compounds and thereafter mixing the treated silica with the other ingredients, or the silicas of (B) can be prepared in the presence of fluid (A) in an in situ method. Such methods of treating silica are broadly known in the art, and are applicable in this invention to prepare the treated silicas if the proper organosiloxane groups are used as defined herein. The treating compounds can include hexamethyldisilazane for (a) organosiloxane groups, symmetrical-tetramethyldivinyldisilazane and $(CH_2=CH(CH_3)_2SiO\{(CH_3)_2SiO\}_3)_2NH$ for (b) organosiloxane groups, symmetrical-dimethyldiphenyldivinyldisilazane for (c) organosiloxane groups and hydroxyl endblocked polydiorganosiloxane having one methylvinylsiloxane unit and one to five dimethylsiloxane units for (d) organosiloxane groups. Other treating compounds and methods for treating the silica are disclosed in Homan et al., U.S. Pat. No. 4,173,560. This patent is hereby incorporated by reference to show the amidosiloxanes, the treated silicas, and the methods of preparing treated silica. Another method of treating silica using bis(polyorganosiloxanyl)amines is disclosed in Lee et al., U.S. Pat. No. 4,152,315. This patent is hereby incorporated by reference to show the amines, the treated silica, and the method of making the treated silica.

The hydroxy end-terminated polydimethylsiloxane fluid (C) is described by formula $HO(Me_2SiO)_nH$ where Me is methyl and n is a value such that the viscosity of the fluid at 25° C. is within a range of about 20 mPa·s to 60 mPa·s. Preferred is when the viscosity at 25° C. is within a range of about 35 mPa·s to 45 mPa·s. About 0.3 to 1.8 percent by weight of component (C) is added to the present composition based upon the total weight of the composition. Greater amounts of component (C) may be added to the composition, but this may cause fouling of molds. Preferred is when about 0.5 to 1.5 percent by weight of component (C) is added to the present composition.

The fluid organohydrogensiloxanes of (D) are well known in the art and are described, for example, by Polmanteer et al., U.S. Pat. No. 3,697,473 and Lee et al., U.S. Pat. No. 3,989,668, which patents are hereby incorporated by reference to show examples of organohydrogensiloxanes known in the art. The organohydrogensiloxanes useful in the present invention can be any of the methylsiloxanes having an average of at least three silicon-bonded hydrogen atoms per molecule and an average of no more than one silicon-bonded hydrogen atom per silicon atom. The remaining valences of the silicon atoms are satisfied by divalent oxygen atoms. The organohydrogensiloxanes can be homopolymers, copolymers, and mixtures thereof which contain dimethylsiloxane units, methylhydrogensiloxane units, dimethylhydrogensiloxy units, trimethylsiloxy units and $SiO_2$ units. Specific examples of organohydrogensiloxanes include polymethylhydrogensiloxane cyclics, copolymers of trimethylsiloxy and methylhydrogensiloxane units, copolymers of dimethylhydrogensiloxy and methylhydrogensiloxane units, copolymers of trimethylsiloxy, dimethylsiloxane, and methylhydrogensiloxane units and copolymers of dimethylhydrogensiloxy, dimethylsiloxane, and methylhydrogensiloxane units. Preferably the organohydrogensiloxanes have an average of at least four silicon-bonded hydrogen atoms per molecule. The amount of organohydrogensiloxane (D) is present in an amount sufficient to provide a ratio of from one to three silicon-bonded hydrogen atoms per vinyl radical in (A) and (B) combined.

The silicone elastomeric compositions can be prepared by mixing ingredients (A), (B), (C) (D), and (E) a platinum catalyst. The platinum catalyst (E) can be any of the platinum-containing catalysts that are known to catalyze the reaction of silicon-bonded hydrogen atoms with silicon-bonded vinyl groups and which are soluble in fluid (A). Platinum-containing catalysts which are not soluble in the fluid mixture are not sufficiently effective to satisfactorily cure the compositions. A class of platinum-containing catalysts particularly suitable for use in these compositions are the complexes prepared from chloroplatinic acid as described by Willing in U.S. Pat. No. 3,419,593 which is hereby incorporated by reference to show the complexes and their preparation. One preferred catalyst of this type is a platinum-containing complex which is the neutralized reaction product of chloroplatinic acid and symdivinyltetramethyldisiloxane.

The platinum catalyst (E) can be present in an amount sufficient to provide at least one part by weight of platinum for every one million parts by weight of fluid (A). It is preferred to use sufficient catalyst (E) so that there is present from 5 to 50 parts by weight platinum for every one million parts by weight of fluid (A). It is to be understood that amounts of platinum greater than 50 parts per million are also effective but are unnecessary, especially when the preferred catalyst is used.

A mixture of (A), (B), (C), (D), and (E) may begin to cure immediately on mixing at room temperature, therefore, it may be desirable to inhibit the action of the catalyst (E) at room temperature with a platinum catalyst inhibitor if the composition is to be stored. Platinum catalyst inhibitors are used to retard the catalytic activity of the platinum at room temperature, but allow the platinum to catalyze the reaction between (A) and (D) at elevated temperature.

One suitable type of platinum catalyst inhibitor is the acetylenic inhibitors described in Kookootsedes et al., U.S. Pat. No. 3,445,420, which is hereby incorporated by reference to show the acetylenic inhibitors and their use as inhibitors. A preferred class of acetylenic inhibitors are the acetylenic alcohols, especially 3,5-dimethyl-hexyn-3-ol.

A second type of platinum catalyst inhibitor is the olefinic siloxanes that are described in Lee et al., U.S. Pat. No. 3,989,667, which is hereby incorporated by reference to show the olefinic siloxanes, their preparation and their use as platinum catalyst inhibitors.

A third type of platinum catalyst inhibitor is a polymethylvinylcyclosiloxane having three to six methylvinylsiloxane units per molecule.

The amount of platinum catalyst inhibitor required is the amount Heeded to produce the desired shelf life and yet not extend the cure time of the silicone elastomeric compositions to an impractical level. The amount will vary widely and will depend upon the particular inhibitor that is used, the nature and concentration of the platinum-containing catalyst (E) and the nature of the organohydrogensiloxane (D).

Inhibitor added in amounts as small as one mole of inhibitor for every mole of platinum will in some instances cause an inhibition of the catalyst (E) and afford a satisfactory pot life. In other cases, considerably more inhibitor, such as 10, 50, 100, 500 and more moles of inhibitor for every mole of platinum may be needed to achieve the desired combination of pot life and cure time. The exact amount of any particular inhibitor to be used can be determined by simple experimentation. The effect of a platinum catalyst inhibitor can be overcome by heating the inhibited compositions to a temperature of 70° C. or higher.

The silicone elastomer compositions can also contain other ingredients such as pigments, extending fillers, and thermal stability additives.

Compositions of the present invention can be used in a liquid injection molding process in which the composition is injected into light weight molds under low pressures, such as 600 kPa cylinder pressure. Such compositions can be cured very rapidly in a hot mold and removed without cooling the mold. The type of molding, extruding or curing process used is not narrowly critical and can include those known in the art. Advantages of the compositions of this invention include extrudability which makes them adaptable to molding processes such as liquid injection molding at low pressures, improved pot-life, and improved mold release. The prepared compositions have a viscosity such that at least 30 grams per minute can be extruded through a 3.2 millimeter (mm) orifice under a pressure of 620 kPa. Preferably, the viscosity is such that at least 40 grams per minute can be extruded.

The silicone elastomeric compositions can readily be prepared in conventional mixing equipment because of their fluid nature. The order of mixing is not critical if the composition is to be used immediately. However, it is preferable to combine (A), (B), (C), and (E) and thereafter add (D). This permits the mixture comprising (A), (B), (C), and (E) to be well mixed prior to the beginning of any curing reaction.

A suitable two package composition can be made using the above described technique. For example, a convenient two package composition can be prepared by mixing part of (A), part of (B) and all of (E) in one package and the remainder of (A) and (B) and all of (C) and (D) in a second package such that equal weight amounts of package one and package two can be mixed to produce the compositions of this invention. Single package compositions can be prepared by mixing (A), (B), (C), (D), (E) and a platinum catalyst inhibitor. These inhibited compositions can be stored for extended periods of time without curing, but the compositions will still cure when heated above 70° C., preferably when heated above 100° C. to shorten the cure time.

The present silicone elastomer compositions are readily extrudable, have improved pot-life, cure to a high strength, high durometer silicon elastomer, and have good mold release.

The following examples are provided to illustrate the present invention. The examples are not intended to limit the scope of the claims herein.

Examples. The effects of a hydroxy end-terminated polydimethylsiloxane having a viscosity of 41 mPa·s at 25° C. on physical properties, pot-life, and mold release of a silicone rubber base composition as described in Table 1 was evaluated. All viscosities are as measured at 25° C.

TABLE 1

Silicone Rubber Base Composition

| Weight Parts | | |
|---|---|---|
| Part A | Part B | Description |
| 100 | 100 | 25 Pa · s Dimethylvinylsiloxy endblocked polydimethylsiloxane |
| 13.6 | 13.6 | 0.35 Pa · s Dimethylvinylsiloxy endblocked polydimethylsiloxane having pendant vinyl substitution and a total vinyl content of 2 mole percent |
| 0.05 | 0.05 | Divinyltetramethyldisilazane |
| 42.6 | 46.1 | Fumed silica, surface area 250 M²/g |
| 1.7 | 1.8 | Water |
| — | 4.9 | 5 mPa · s Methylhydrogensiloxane having 0.76 weight percent hydrogen |
| — | 0.1 | 1-Ethynyl-1-cyclohexane |

The evaluation was conducted by mixing equal parts of part A and part B of the composition and various concentration of the hydroxy end-terminated polydimethylsiloxane (component C) as described in the tables below. Samples of the silicone rubber compositions were cured at 170° C. for 5 minutes and were tested for physical properties by standard methods. The test methods and results are described in Table 2.

TABLE 2

Physical Properties

| | | Component (C) | |
|---|---|---|---|
| Property | Test Method | 0.2 Wt % | 0.5 Wt % |
| Modulus (100%), MPa | ASTM-412 | 0.8 | 1.3 |
| Modulus (300%), MPa | ASTM-412 | 3.3 | 4.0 |
| Tensile, MPa | ASTM-412 | 9.0 | 8.8 |
| Elongation, % | ASTM-412 | 725 | 575 |
| Tear (Die B), kN/m | ASTM-D625 | 37.7 | 39.3 |
| Durometer (Shore A) | ASTM-D2240 | 38 | 40 |
| Resilience | ASTM-D2632 | 55 | 58 |

To test the mold release of the compositions, the mixed composition were spread onto steel test panels and cured at 170° C. for five minutes. A peel test was performed using an Instron tester at a rate of 500 mm per minute. The peak force (kN/M) required to pull the cured silicone rubber off the steel panel is reported in Table 3 along with the percent by weight of the hydroxy end-terminated polydimethylsiloxane (Component (C)).

TABLE 3

Mold Release of Silicone Compositions

| Component (C) (Wt. %) | Release Force (kN/M) |
|---|---|
| 0.2 | 9.4 |
| 0.5 | 4.1 |
| 1.0 | 5.0 |
| 1.5 | 5.5 |

The pot-life of each deaired silicone composition was tested by forcing the composition through a 3.2 mm orifice of a nozzle at 620 kPa. The pot-life is reported in Table 4 as the time at which the extrusion rate of the composition reachs one-half of the initial extrusion rate.

TABLE 4

| Pot-Life of Silicone Compositions | |
|---|---|
| Component (C) (Wt. %) | Pot-Life (Hours) |
| 0.35 | 22 |
| 0.50 | 56 |
| 0.90 | 75 |

We claim:

1. A silicone elastomeric composition comprising:
   (A) 100 parts by weight of a triorganosiloxy endblocked polydimethylsiloxane fluid in which the triorganosiloxy units are selected from the group consisting of dimethylvinylsiloxy and methylphenylvinylsiloxy, the fluid being a mixture of polymeric species of varying molecular weight where each species is present in an amount sufficient to collectively provide a molecular weight distribution such that there is present at least one polymeric species (1) at a concentration greater than the concentrations of adjacent polymeric species of lower and higher molecular weight where polymeric species (1) is identified as a peak molecular weight as determined by gel permeation chromatographic analysis and there being a peak molecular weight of polymeric species in the range of from 68,000 to 135,000 at a major concentration, in the fluid the molecular weight of the lowest molecular weight polymeric species being in the range of from 854 to 3146 and the molecular weight of the highest molecular weight species being in the range of from 174,000 to 370,000, the mixture of polymeric species having a molecular weight distribution such that a dispersity index has a value greater than 3.8,
   (B) from 20 to 60 parts by weight of a reinforcing amorphous silica having a surface area of greater than 100 $M^2/g$, the surface of the silica having silicon atoms to which are bonded organosiloxane groups selected from the group consisting of
      (a) $Me_3SiO-$,
      (b) $ViMe_2SiO(Me_2SiO)_x-$,
      (c) $ViMePhSiO(Me_2SiO)_x-$, and
      (d) $-O(MeVi)Si-(OSiMe_2)_y-O-$ ;
   where Me is methyl, Vi is vinyl, Ph is phenyl, x is an integer of 0 to 20, and y is an integer of one to five, the organosiloxane groups being present in an amount such that there is from 0.05 to 0.32 percent by weight vinyl based on the weight of the silica and the organosiloxane groups being present in a mole ratio such that there are from seven to 50 moles of (a) for each mole of (b), (c), (d), or mixtures thereof,
   (C) about 0.3 to 1.8 percent by weight of hydroxy end-terminated polydimethylsiloxane having a viscosity at 25° C. within a range of about 20 mPa·s to 60 mPa·s,
   (D) an amount of a fluid organohydrogensiloxane sufficient to provide from one to three silicon-bonded hydrogen atoms per vinyl radical in (A) and (B) combined, the organohydrogensiloxane having an average of at least three silicon-bonded hydrogen atoms per molecule and consisting essentially of units selected from a group consisting of methylhydrogensiloxane, dimethylsiloxane, dimethylhydrogensiloxy, trimethyl siloxy, and $SiO_2$ units, and
   (E) an amount of a platinum catalyst sufficient to provide at least one part by weight per one million parts by weight of (A).

2. The silicone elastomeric composition according to claim 1 in which the triorganosiloxy endblocked polydimethylsiloxane fluid of (A) has a peak molecular weight in the range of 80,000 to 120,000 at a major concentration and a dispersity index in the range of six to 12.

3. The silicone elastomeric composition according to claim 1 in which the triorganosiloxy endblocked polydimethylsiloxane fluid of (A) contains two peak molecular weights where the peak molecular weight in the range of from 68,000 to 135,000 being at a major concentration and another peak molecular weight in the range of from 4,000 to 24,100 being at a minor concentration.

4. The silicone elastomeric composition according to claim 1 in which the triorganosiloxy unit of (A) is dimethylvinylsiloxy and the silica of (B) has a surface area of 120 to 600 $M^2/g$, the organosiloxane groups are (a) and (b) where x has a value of 0 to five, and the silica is present in an amount of from 35 to 45 parts by weight.

5. The silicone elastomeric composition according to claim 2 in which the triorganosiloxy of (A) is dimethylvinylsiloxy and the silica of (B) has a surface area of 120 to 600 $M^2/g$, the organosiloxane groups are (a) and (b) where x has a value of 0 to five, and the silica is present in an amount of from 35 to 45 parts by weight.

6. The silicone elastomeric composition according to claim 1 in which the triorganosiloxy of (A) is dimethylvinylsiloxy and the silica of (B) has a surface area of 120 to 600 $M^2/g$, the organosiloxane groups are (a) and (d) where y has a value of one to five and the silica is present in an amount of from 35 to 45 parts by weight.

7. The silicone elastomeric composition according to claim 2 in which the triorganosiloxy of (A) is dimethylvinylsiloxy and the silica of (B) has a surface area of 120 to 600 $M^2/g$, the organosiloxane groups are (a) and (d) where y has a value of one to five inclusive, and the silica is present in an amount of from 35 to 45 parts by weight.

8. The silicone elastomeric composition according to claim 3 in which the triorganosiloxy unit of (A) is dimethylvinylsiloxy and the silica of (B) has a surface area of 120 to 600 $M^2/g$, the organosiloxane groups are (a) and (b) where x has a value of 0 to five inclusive, and the silica is present in an amount of from 35 to 45 parts by weight.

9. The silicone elastomeric composition according to claim 3 in which the triorganosiloxy unit of (A) is dimethylvinylsiloxy and the silica of (B) has a surface area of 120 to 600 $M^2/g$, the organosiloxane groups are (a) and (d) where y has a value of one to five inclusive and the silica is present in an amount of from 35 to 45 parts by weight.

10. The silicone elastomeric composition according to claim 3 in which the peak molecular weight at the major concentration is in the range of 80,000 to 120,000 and the peak molecular weight at the minor concentration is in the range of 7,000 to 15,000.

11. The silicone elastomeric composition according to claim 8 in which the peak molecular weight at the major concentration is in the range of 80,000 to 120,000 and the peak molecular weight at the minor concentration is in the range of 7,000 to 15,000.

12. The silicone elastomeric composition according to claim 9 in which the peak molecular weight at the major concentration is in the range of 80,000 to 120,000 and the peak molecular weight at the minor concentration is in the range of 7,000 to 15,000.

13. The silicone elastomeric composition according to claim 1 in which there is also present an amount of a platinum catalyst inhibitor sufficient to extend the shelf life at ambient temperature.

14. The silicone elastomeric composition according to claim 1 in which the hydroxy end-terminated polydimethylsiloxane has a viscosity within a range of about 35 mPa·s to 45 mPa·s and comprises about 0.5 to 1.5 percent by weight of the composition.

15. The silicone elastomeric composition according to claim 4 in which the hydroxy end-terminated polydimethylsiloxane has a viscosity within a range of about 35 mPa·s to 45 mPa·s and comprises about 0.5 to 1.5 percent by weight of the composition.

16. The silicone elastomeric composition according to claim 5 in which the hydroxy end-terminated polydimethylsiloxane has a viscosity within a range of about 35 mPa·s to 45 mPa·s and comprises about 0.5 to 1.5 percent by weight of the composition.

17. The silicone elastomeric composition according to claim 6 in which the hydroxy end-terminated polydimethylsiloxane has a viscosity within a range of about 35 mPa·s to 45 mPa·s and comprises about 0.5 to 1.5 percent by weight of the composition.

18. The silicone elastomeric composition according to claim 7 in which the hydroxy end-terminated polydimethylsiloxane has a viscosity within a range of about 35 mPa·s to 45 mPa·s and comprises about 0.5 to 1.5 percent by weight of the composition.

19. The silicone elastomeric composition according to claim 10 in which the hydroxy end-terminated polydimethylsiloxane has a viscosity within a range of about 35 mPa·s to 45 mPa·s and comprises about 0.5 to 1.5 percent by weight of the composition.

20. The silicone elastomeric composition according to claim 11 in which the hydroxy end-terminated polydimethylsiloxane has a viscosity within a range of about 35 mPa·s to 45 mPa—s and comprises about 0.5 to 1.5 percent by weight of the composition.

21. The silicone elastomeric composition according to claim 12 in which the hydroxy end-terminated polydimethylsiloxane has a viscosity within a range of about 35 mPa·s to 45 mPa·s and comprises about 0.5 to 1.5 percent by weight of the composition.

* * * * *